United States Patent
Oomura

(10) Patent No.: US 8,226,523 B2
(45) Date of Patent: Jul. 24, 2012

(54) STRUCTURE FOR SUPPORTING A SLEEVE MEMBER IN AUTOMATIC TRANSMISSION

(75) Inventor: Tomohiro Oomura, Fuji (JP)

(73) Assignee: JATCO Ltd, Fuji-shi (JP)

( * ) Notice: Subject to any disclaimer, the term of this patent is extended or adjusted under 35 U.S.C. 154(b) by 325 days.

(21) Appl. No.: 12/498,040

(22) Filed: Jul. 6, 2009

(65) Prior Publication Data

US 2010/0009765 A1    Jan. 14, 2010

(30) Foreign Application Priority Data

Jul. 11, 2008  (JP) .................. 2008-181185
Sep. 4, 2008   (JP) .................. 2008-227559

(51) Int. Cl.
  *F16H 57/021*  (2012.01)
(52) U.S. Cl. ........................ 475/347; 464/180
(58) Field of Classification Search .............. 464/180, 464/182; 475/5, 347; 417/321, 410.4
See application file for complete search history.

(56) References Cited

U.S. PATENT DOCUMENTS

| | | | |
|---|---|---|---|
| 4,127,080 A * | 11/1978 | Lakiza et al. ............. | 464/180 X |
| 4,949,821 A | 8/1990 | Murota et al. | |
| 7,413,417 B2 | 8/2008 | Klaus et al. | |
| 7,489,114 B2 | 2/2009 | Nomura et al. | |
| 2005/0265858 A1 | 12/2005 | Klaus et al. | |
| 2007/0225098 A1 | 9/2007 | Tabata et al. | |
| 2010/0005925 A1 * | 1/2010 | Oomura | |

FOREIGN PATENT DOCUMENTS

| | | | |
|---|---|---|---|
| DE | 10 2005 040 0770 A1 * | 3/2007 | |
| JP | 07-076229 A | 3/1995 | |
| JP | 2006-194299 A | 7/2006 | |
| WO | WO 2004/042257 A1 | 5/2004 | |

OTHER PUBLICATIONS

U.S. Appl. No. 12/498,017, filed Jul. 6, 2009, Oomura.
T. Oomura, U.S. PTO Notice of Allowance and Allowability, U.S. Appl. No. 12/498,017, dated Sep. 9, 2011, 11 pages.

* cited by examiner

*Primary Examiner* — Gregory Binda
(74) *Attorney, Agent, or Firm* — Foley & Lardner LLP

(57) ABSTRACT

A sleeve supporting structure for an automatic transmission has an input shaft and an oil pump with an inner gear. The sleeve supporting structure includes a sleeve member that is supported at least two portions thereof in an axial direction of the sleeve member and configured to transmit rotation of the input shaft to the inner gear and drive the oil pump, an outer member that is disposed on a radial outside of the sleeve member, and an elastic member that is disposed on the sleeve member. The elastic member is disposed in a predetermined position in the axial direction of the sleeve member in which an amplitude of vibration of the sleeve member becomes maximum when a vibrating force is applied to the sleeve member from the inner gear. The elastic member is opposed to the outer member in the predetermined position.

6 Claims, 4 Drawing Sheets

STRUCTURE FOR SUPPORTING A SLEEVE MEMBER IN AUTOMATIC TRANSMISSION

BACKGROUND OF THE INVENTION

The present invention relates to a structure for supporting a sleeve member in an automatic transmission.

Japanese Patent Application First Publication No. 7-076229 describes an automatic transmission to which an assist motor is incorporated. In the automatic transmission, a sleeve member is connected with an input shaft and an inner gear of an oil pump to thereby transmit rotation of the input shaft to the inner gear and drive the oil pump.

SUMMARY OF THE INVENTION

In the above-described conventional art, rotational vibration that is caused due to the rotation of inner gear is directly inputted to the connection between the sleeve member and the inner gear. This will cause vibration in the sleeve member, thereby generating noise.

An object of the present invention is to provide a sleeve supporting structure for an automatic transmission that is adapted to drive an oil pump by a sleeve member provided on an input shaft, in which vibration in the sleeve member can be reduced to thereby suppress occurrence of noise.

In one aspect of the present invention, there is provided a sleeve supporting structure for an automatic transmission, the automatic transmission including an input shaft and an oil pump with an inner gear, the sleeve supporting structure comprising:

a sleeve member that is supported at at least two portions thereof in an axial direction of the sleeve member, the sleeve member being configured to transmit rotation of the input shaft to the inner gear of the oil pump and drive the oil pump, an outer member that is disposed on a radial outside of the sleeve member; and an elastic member that is disposed on the sleeve member;

wherein the elastic member is disposed in a predetermined position in the axial direction of the sleeve member in which an amplitude of vibration of the sleeve member becomes maximum when a vibrating force is applied to the sleeve member from the inner gear, and the elastic member is opposed to the outer member in the predetermined position.

DETAILED DESCRIPTION OF THE INVENTION

Figure 1:
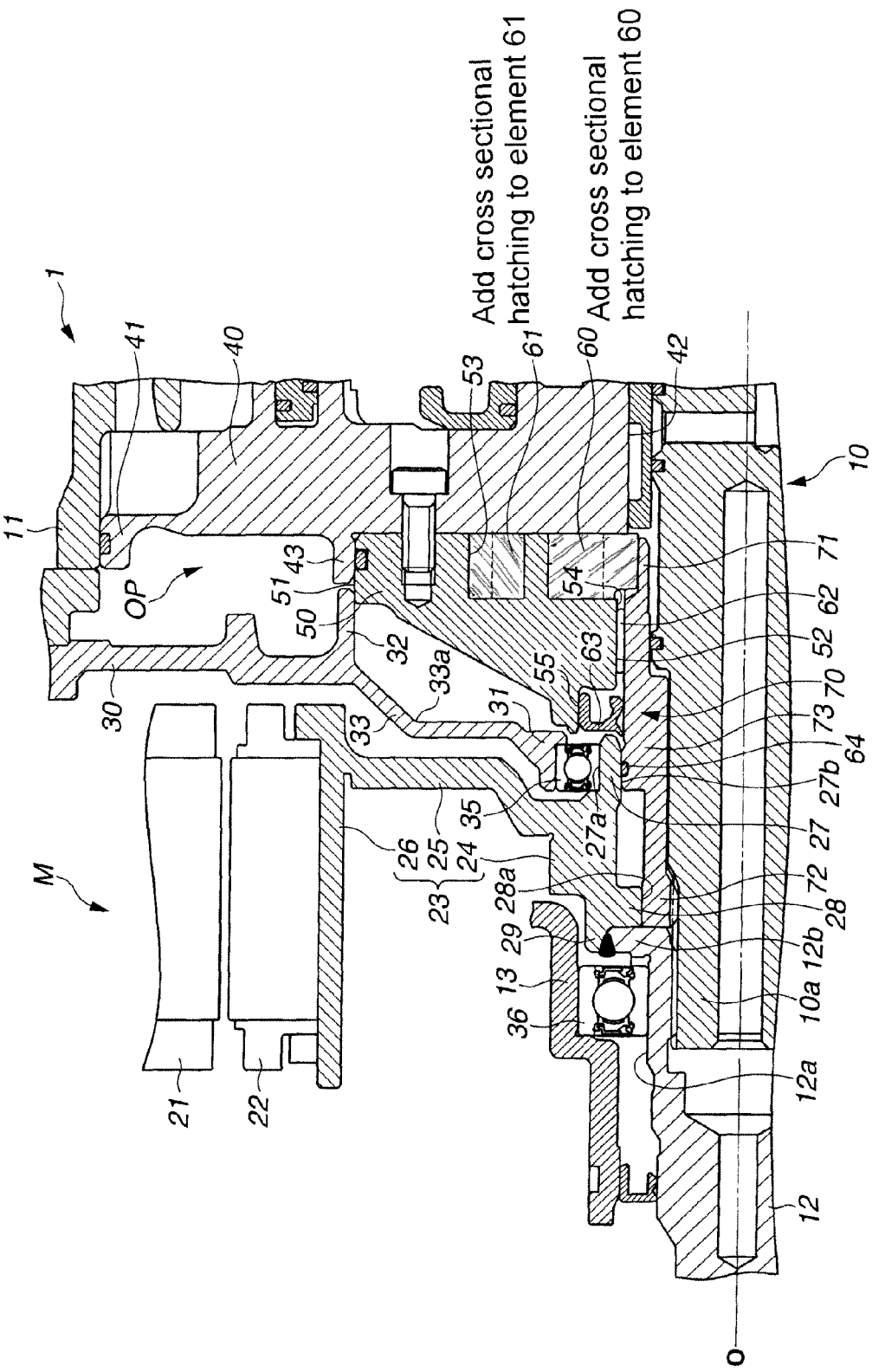
FIG. 1 is a sectional view of an essential part of an automatic transmission, to which a sleeve supporting structure according to an embodiment of the present invention is incorporated.
Figure 2:
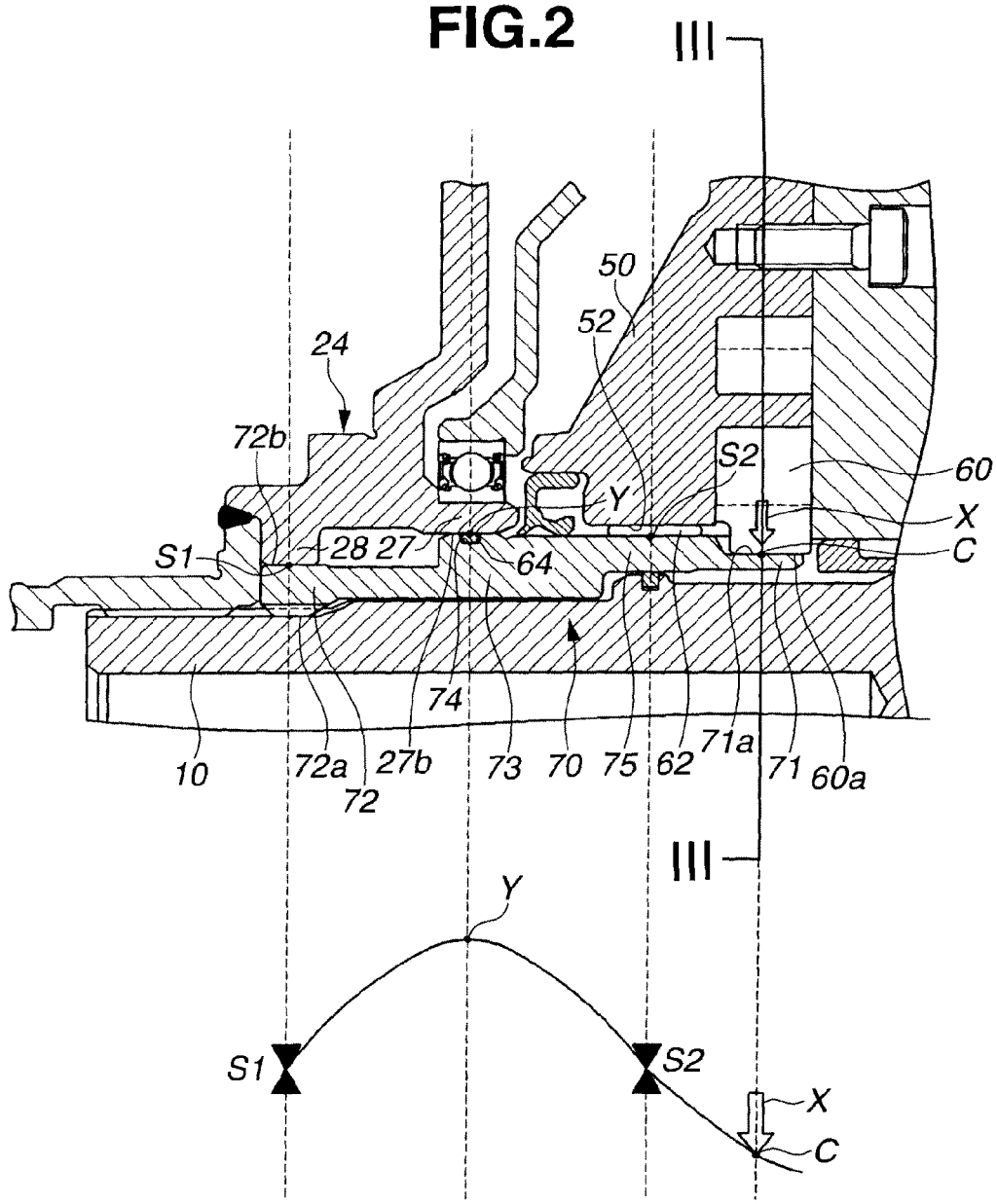
FIG. 2 is an explanatory diagram showing a position where an amplitude of vibration that is caused due to a vibrating force inputted from an oil pump to a sleeve member of the sleeve supporting structure shown in FIG. 1 becomes maximum.

In the followings, an embodiment of the present invention will be described with reference to the accompanying drawings. In this embodiment, a structure for supporting a sleeve member in an automatic transmission is applied to supporting a cylindrical sleeve-shaped oil pump drive shaft that is configured to transmit rotation of an input shaft of the automatic transmission to an inner gear of an oil pump and thereby drive the oil pump. FIG. 1 illustrates an enlarged section of a part of the automatic transmission, taken along an axis of the input shaft of the automatic transmission, to which the structure according to the embodiment of the present invention is incorporated. FIG. 2 is an explanatory diagram illustrating a vibrating force that is exerted on the oil pump drive shaft of the structure shown in FIG. 1.

As illustrated in FIG. 1, automatic transmission 1 includes motor M and oil pump OP which are disposed in sequence from a left side as viewed in FIG. 1 (that is, from a side of an engine, not shown) in a direction of axis O of input shaft 10 of automatic transmission 1. Motor M and oil pump OP are disposed adjacent to each other in the axial direction of input shaft 10. Oil pump drive shaft 70 is fitted onto input shaft 10.

Motor M includes stator 21 that is disposed on an inner circumferential surface (not shown) of transmission case 11, and rotor 22 that is opposed to stator 21 in a radial direction of motor M perpendicular to a rotation axis of motor M, i.e., in a direction perpendicular to the axial direction of input shaft 10. Rotor 22 is connected with input shaft 10 through rotor support 23 and transmission shaft 12 as explained later, and is operative to make unitary rotation with input shaft 10.

Rotor support 23 includes rotational shaft portion 24, extension 25 radially outwardly extending from rotational shaft portion 24, and support portion 26 connected with extension 25. Rotational shaft portion 24 is fitted onto oil pump drive shaft 70. Extension 25 extends from an end portion of rotational shaft portion 24 which is located on a side of oil pump OP, in a radially outward direction of motor M. Rotor 22 is fixed to and supported by support portion 26.

Rotational shaft portion 24 includes axial extension 27 that extends from one axial end portion of rotational shaft portion 24 toward the side of oil pump OP in an axial direction of rotational shaft portion 24, i.e., in the axial direction of motor M. Rotational shaft portion 24 further includes radial extension 28 that extends from an opposite axial end portion of rotational shaft portion 24 in a radially inward direction of rotational shaft portion 24, i.e., in a radially inward direction of motor M. Radial extension 28 is fitted onto outer circumferential surface 72b of reduced diameter portion 72 of oil pump drive shaft 70 which is reduced in diameter, such that inner circumferential surface 28a of extension 28 is in contact with outer circumferential surface 72b of an axial tip end portion of reduced diameter portion 72. Radial extension 28 and the axial tip end portion of reduced diameter portion 72 which are fitted to each other cooperate with each other to form a faucet joint.

Figure 4:
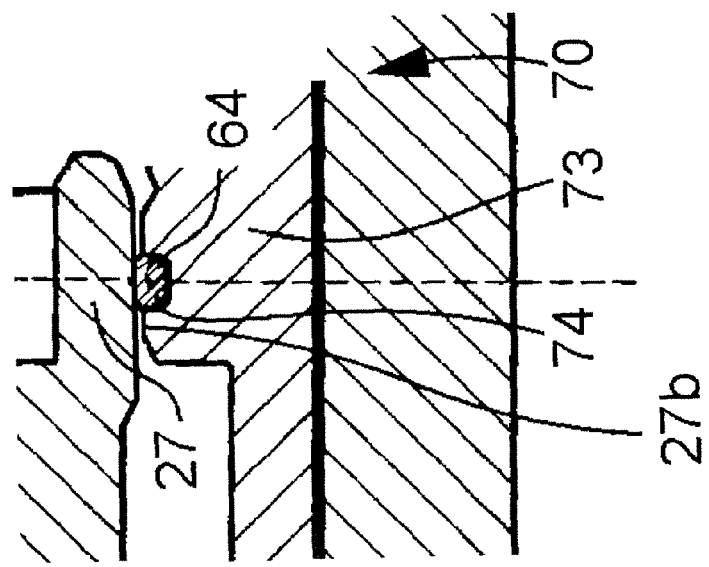
FIG. 4 is close up view of the interface between the shaft and the axial extension.

Axial extension 27 of rotational shaft portion 24 is rotatably supported by support portion 31 of partition wall 30 through radial bearing 35. Support portion 31 is formed on a radial inside of partition wall 30 that serves as a stationary member. Radial bearing 35 is disposed between outer circumferential surface 27a of axial extension 27 and an inner circumferential surface of support portion 31. Inner circumferential surface 27b of axial extension 27 is opposed to an outer circumferential surface of middle portion 73 of oil pump drive shaft 70 which is located in a substantially middle position in the axial direction of oil pump drive shaft 70, with a slight radial clearance therebetween, as seen in FIG. 4.

Partition wall 30 has projection 32 on a surface thereof that is opposed to the side of oil pump OP. Projection 32 extends in the axial direction of input shaft 10 and has a ring shape having a center aligned with axis O of input shaft 10 when viewed from the side of oil pump OP in an axial direction of oil pump OP. A tip end portion of projection 32 is fitted onto outer circumferential surface 51 of oil pump housing 50 over the entire circumference thereof so as to form a faucet joint in cooperation with oil pump housing 50. An inner circumferential surface of the tip end portion of projection 32 and outer circumferential surface 51 of oil pump housing 50 are in contact with each other over the entire circumferences thereof.

Partition wall 30 has a reduced and uniform thickness so as to be elastically deformable in a region extending from support portion 31 to the tip end portion of projection 32 which is fitted onto outer circumferential surface 51 of oil pump housing 50. Specifically, partition wall 30 includes reduced thickness portion 33 that is disposed between support portion 31 and the tip end portion of projection 32. Reduced thickness portion 33 extends from support portion 31 in the radially outward direction of input shaft 10 and is bent at bend 33a in a middle portion of reduced thickness portion 33 in such a direction as to be apart from motor M. With the provision of bend 33a, a total length of reduced thickness portion 33 which extends on both sides of bend 33a is increased to thereby enhance the elastic deformability of reduced thickness portion 33.

Oil pump OP is a gear pump that is provided between oil pump cover 40 and oil pump housing 50 disposed on the side of motor M. Oil pump OP is so constructed as to produce hydraulic pressure by rotating inner gear 60 and outer gear 61 with mutual meshing in an eccentric state relative to each other.

Oil pump cover 40 has a generally disk shape when viewed from the axial direction of oil pump OP. Oil pump cover 40 is fitted into transmission case 11 through engaging portion 41 that is formed on an outer circumferential surface of oil pump cover 40. Oil pump cover 40 has opening 42 at a central portion thereof through which input shaft 10 of automatic transmission 1 extends in transmission case 11. Further, oil pump cover 40 has circumferential wall 43 on a surface thereof which is opposed to the side of motor M. Circumferential wall 43 extends in the axial direction of oil pump OP and has an annular shape having a center aligned with axis O of input shaft 10 when viewed from the side of motor M in the axial direction of oil pump OP.

Circumferential wall 43 has an inner diameter that is equivalent to an outer diameter of oil pump housing 50. Oil pump housing 50 is assembled to oil pump cover 40 by fitting outer circumferential surface 51 of oil pump housing 50 to an inner circumferential surface of circumferential wall 43.

Oil pump housing 50 is disposed coaxially with oil pump drive shaft 70. Oil pump housing 50 has opening 54 at a central portion thereof in an axial direction of oil pump housing 50. Opening 54 extends through oil pump housing 50 in the axial direction of oil pump housing 50, through which oil pump drive shaft 70 extends toward the side of motor M in an axial direction thereof, i.e., in the axial direction of oil pump housing 50. Opening 54 includes increased diameter portion 55 that is increased in diameter and located on the side of motor M of oil pump housing 50. Oil seal 63 is installed into increased diameter portion 55.

Figure 3:
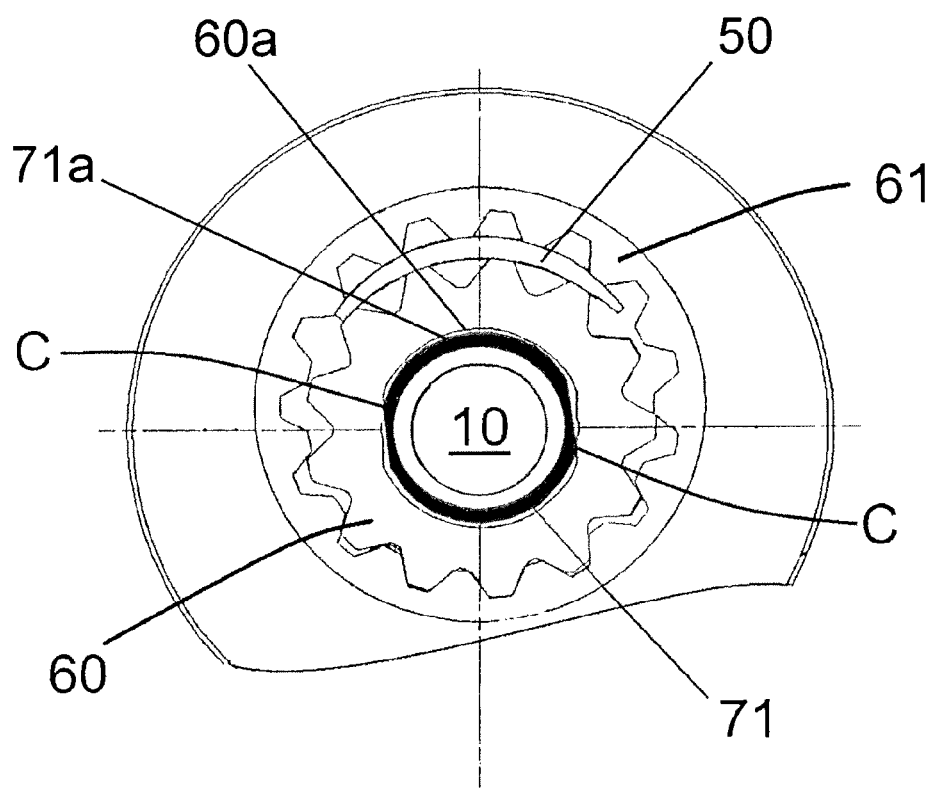
FIG. 3 is a schematic view showing the coupling portion of the inner gear and the connecting portion taken along line III-III in FIG. 2.

As shown in FIG. 2, oil pump drive shaft 70 is fitted onto input shaft 10. Oil pump drive shaft 70 is in the form of a sleeve member and disposed coaxially with input shaft 10. Oil pump drive shaft 70 has one axial end portion that is overlapped with rotational shaft portion 24 of rotor support 23 of motor M in a radial direction of input shaft 10, and an opposite axial end portion that is in meshing engagement with inner gear 60 of oil pump OP. Oil pump drive shaft 70 extends between the axial end portions opposed to each other in an axial direction thereof. Specifically, oil pump drive shaft 70 is disposed on a radial inside of oil pump OP and has connecting portion 71 on the opposite axial end portion which is coupled with inner gear 60. Inner gear 60 has a coupling portion on inner circumferential surface 60a, and connecting portion 71 has the coupling portion on outer circumferential surface 71a corresponding to the coupling portion of inner gear 60. As seen in FIG. 3, the respective coupling portions have a width across flat structure including substantially flat surfaces which are spaced from each other along the circumferential direction of inner gear 60 and connecting portion 71. The substantially flat surfaces of the coupling portion on inner circumferential surface 60a are in mating contact with the substantially flat surfaces of the coupling portion on outer circumferential surface 71a. Owing to the coupling between inner circumferential surface 60a of inner gear 60 and outer circumferential surface 71a of connecting portion 71, inner gear 60 is rotatable about axis O (shown in FIG. 1) of input shaft 10 together with oil pump drive shaft 70.

Further, oil pump drive shaft 70 has reduced diameter portion 72 on a side of the one axial end portion thereof. Inner circumferential surface 72a of an axial tip end portion of reduced diameter portion 72 is connected with the outer circumferential surface of input shaft 10 through a spline joint therebetween. Reduced diameter portion 72 is thus connected with input shaft 10 so that oil pump drive shaft 70 is rotatable about axis O (shown in FIG. 1) of input shaft 10 together with input shaft 10.

Middle portion 73 of oil pump drive shaft 70 in the axial direction has groove 74 on an outer circumferential surface thereof which extends over the entire circumference thereof. O-ring 64 that serves as an elastic member is disposed in groove 74 to be partly exposed on and beyond the outer surface circumferential of middle portion 73 of oil pump drive shaft 70 and opposed to inner circumferential surface 27b of axial extension 27 of rotational shaft portion 24 of motor M. In the vicinity of O-ring 64, there is a slight radial clearance between inner circumferential surface 27b of axial extension 27 and the outer circumferential surface of middle portion 73.

Oil pump drive shaft 70 is supported at at least two portions which are disposed between connecting portion 71 and reduced diameter portion 72 in a spaced relation to each other in order to suppress displacement of an axis of oil pump drive shaft 70. Specifically, oil pump drive shaft 70 includes supported portion 75 that is located adjacent to connecting portion 71 in the axial direction of oil pump drive shaft 70. Supported portion 75 is supported by oil pump housing 50 through bushing 62 that is interposed between inner circumferential surface 52 of oil pump housing 50 and an outer circumferential surface of supported portion 75. In addition, the axial tip end portion of reduced diameter portion 72 of oil pump drive shaft 70 is supported by radial extension 28 of rotational shaft portion 24 of motor M through the faucet joint described above. Thus, oil pump drive shaft 70 is supported at supported portion 75 and the axial tip end portion of reduced diameter portion 72 which are spaced from each other in the axial direction of oil pump drive shaft 70.

Referring to FIG. 2, there is shown an amplitude of vibration that is caused in oil pump drive shaft 70 due to rotation of inner gear 60. A vibrating force is inputted from the side of oil pump OP to connecting portion 71 of oil pump drive shaft 70. As shown in FIG. 2, if the vibrating force is applied to point C that is located at the connection between inner gear 60 and connecting portion 71, oil pump drive shaft 70 undergoes vibration having two nodes located at two support points S1 and S2 on oil pump drive shaft 70, respectively. That is, support point S1 is located at the axial tip end portion of reduced diameter portion 72 of oil pump drive shaft 70 which is supported by radial extension 28 of rotational shaft portion 24, whereas support point S2 is located at supported portion 75 which is supported by oil pump housing 50 through bushing 62. In this case, if the vibrating force is applied to point C in a radial direction of oil pump drive shaft 70 as indicated by arrow X in FIG. 2, middle portion 73 of oil pump drive shaft 70 between the two support points S1 and S2 will undergo deflection to thereby generate vibration in the radial direction of oil pump drive shaft 70. The amplitude of the vibration of oil pump drive shaft 70 becomes maximum in position Y. As a result, middle portion 73 is caused to impinge against axial extension 27 of rotational shaft portion 24 which is disposed on the radial outside of oil pump drive shaft 70, thereby causing occurrence of noise.

In this embodiment, O-ring 64 (i.e., the elastic member) is disposed in a predetermined position (i.e., position Y) at middle portion 73 of oil pump drive shaft 70 between the two support points S1 and S2 in the axial direction of oil pump drive shaft 70. Thus, when the vibrating force is inputted from inner gear 60 of oil pump OP to connecting portion 71 of oil pump drive shaft 70 in the radial direction of oil pump drive shaft 70, the amplitude of the vibration of oil pump drive shaft 70 becomes maximum in the predetermined position (i.e., position Y). In the predetermined position, O-ring 64 is opposed to axial extension 27 of rotational shaft portion 24 which is disposed on the radial outside of oil pump drive shaft 70. With this arrangement of O-ring 64, the vibration of oil pump drive shaft 70 due to the rotation of oil pump OP can be damped by O-ring 64. As a result, it is possible to suppress transmission of the vibration from oil pump drive shaft 70 toward rotational shaft portion 24 and avoid occurrence of noise due to impingement of oil pump drive shaft 70 against axial extension 27.

Input shaft 10 extends through opening 42 of oil pump cover 40 and opening 54 of oil pump housing 50 so as to transmit the rotation inputted from motor M to a side of a transmission mechanism (not shown) through input shaft 10. Input shaft 10 includes projecting portion 10a that projects toward the side of the engine with respect to the axial tip end of reduced diameter portion 72 of oil pump drive shaft 70. Projecting portion 10a connected with transmission shaft 12 through a spline joint between an outer circumferential surface of projecting portion 10a and an inner circumferential surface of transmission shaft 12 that transmits the rotation inputted from the side of the engine to input shaft 10.

Rotational shaft portion 24 of motor M has circumferential wall 29 on an outer circumferential side of an axial end surface of the opposite axial end portion thereof. Circumferential wall 29 extends from the outer circumferential side of the axial end surface of rotational shaft portion 24 toward the side of the engine in the axial direction of motor M. Transmission shaft 12 includes flange 12b that extends in a radially outward direction of transmission shaft 12. Flange 12b is interposed between input shaft 10 and circumferential wall 29 and joined with circumferential wall 29 at a welded connection therebetween. Transmission shaft 12 is rotatably supported by stationary member 13 of transmission casing 11 through radial bearing 36 that is disposed between stationary member 13 and outer circumferential surface 12a of transmission shaft 12.

As explained above, in automatic transmission 1 including oil pump drive shaft 70 as the sleeve member which is configured to transmit rotation of input shaft 10 to inner gear 60 of oil pump OP and thereby drive oil pump OP, oil pump drive shaft 70 is supported at at least two portions in the axial direction of oil pump drive shaft 70 by bushing 62 and radial extension 28 of rotational shaft portion 24 of motor M, respectively. O-ring 64 is disposed in the predetermined position (i.e., position Y) on oil pump drive shaft 70 in which an amplitude of vibration of oil pump drive shaft 70 becomes maximum when vibrating force is inputted from inner gear 60 to connecting portion 71 of oil pump drive shaft 70, and O-ring 64 is opposed to axial extension 27 of rotational shaft portion 24 disposed on the radial outside of oil pump drive shaft 70. Thus, oil pump drive shaft 70 is arranged to be opposed to axial extension 27 of rotational shaft portion 24 via O-ring 64 that is interposed therebetween.

Since O-ring 64 is disposed in the predetermined position (i.e., position Y) on oil pump drive shaft 70 in which the amplitude of vibration of oil pump drive shaft 70 becomes maximum when vibrating force is inputted to connecting portion 71 on the axial end side of oil pump drive shaft 70 due to rotation of inner gear 60, the vibration of oil pump drive shaft 70 can be absorbed by O-ring 64. Accordingly, with the arrangement of O-ring 64, it is possible to suppress transmission of the vibration to a side of rotational shaft portion 24 disposed on the radial outside of oil pump drive shaft 70 and avoid occurrence of noise due to impingement of middle portion 73 of oil pump drive shaft 70 against axial extension 27 of rotational shaft portion 24. As a result, isolation of the vibration can be performed without using a rubber vibration isolator. Further, O-ring 64 is biased toward axial extension 27 when the vibrating force is inputted to oil pump drive shaft 70 in the radial direction of oil pump drive shaft 70 due to rotation of inner gear 60. Therefore, O-ring can serve as not only the elastic member but also an oil seal.

The present invention is not limited to the above embodiment in which the sleeve supporting structure is applied to the automatic transmission including motor M and oil pump OP which are disposed along the axial direction of input shaft 10. The sleeve supporting structure of the present invention can be applied to various types of automatic transmissions which include a sleeve member for transmitting rotation of an input shaft to an inner gear of an oil pump.

This application is based on prior Japanese Patent Application No. 2008-181185 filed on Jul. 11, 2008 and Japanese Patent Application No. 2008-227559 filed on Sep. 4, 2008. The entire contents of the Japanese Patent Application No. 2008-181185 and the Japanese Patent Application No. 2008-227559 are hereby incorporated by reference.

Although the invention has been described above by reference to a certain embodiment of the invention, the invention is not limited to the embodiment described above. Modifications and variations of the embodiment described above will occur to those skilled in the art in light of the above teachings. The scope of the invention is defined with reference to the following claims.

What is claimed is:
1. An automatic transmission, comprising:
an input shaft;
an oil pump with an inner gear; and
a sleeve supporting structure comprising:
 a sleeve member that is supported at least two portions thereof in an axial direction of the sleeve member, the sleeve member being configured to transmit rotation of the input shaft to the inner gear of the oil pump,
 an outer member that is disposed on a radial outside of the sleeve member, the outer member being a rotational shaft portion of a motor, and
 an elastic member that is disposed on the sleeve member, wherein the elastic member is disposed in a predetermined position in the axial direction of the sleeve member in which an amplitude of vibration of the sleeve member becomes maximum when a vibrating force is applied to the sleeve member from the inner gear, and wherein the elastic member is opposed to the outer member in the predetermined position.

2. The automatic transmission as claimed in claim 1, wherein the elastic member is an O-ring that is disposed on an outer circumferential surface of the sleeve member.

3. The automatic transmission as claimed in claim 1, wherein the sleeve member is supported at two portions thereof that are spaced from each other in the axial direction of the sleeve member, and the predetermined position is located at a middle portion between the two portions.

4. The automatic transmission as claimed in claim 1, wherein the sleeve member and the outer member are opposed to each other to form a radial clearance between an outer circumferential surface of the sleeve member and an inner circumferential surface of the outer member in the predetermined position.

5. The automatic transmission as claimed in claim 1, wherein the sleeve member is disposed on a radial inside of the oil pump and coupled with the inner gear.

6. The automatic transmission as claimed in claim 1, wherein the elastic member is biased toward the outer member and serves as an oil seal.

\* \* \* \* \*